United States Patent
Djupsjöbacka

[11] Patent Number: 6,122,086
[45] Date of Patent: Sep. 19, 2000

[54] COMPENSATION OF DISPERSION

[75] Inventor: Anders Djupsjöbacka, Solna, Sweden

[73] Assignee: Telefonaktiebolaget LM Ericsson, Stockholm, Sweden

[21] Appl. No.: 09/038,478

[22] Filed: Feb. 5, 1998

Related U.S. Application Data

[63] Continuation of application No. PCT/SE96/00986, Aug. 2, 1996.

[30] Foreign Application Priority Data

Aug. 16, 1995 [SE] Sweden ................................. 9502855

[51] Int. Cl.[7] ..................................................... H04B 10/04
[52] U.S. Cl. ............................................ 359/181; 359/183
[58] Field of Search ................................ 359/161, 158, 359/180, 181, 183; 375/269; 332/145

[56] References Cited

U.S. PATENT DOCUMENTS

| | | | |
|---|---|---|---|
| 4,192,970 | 3/1980 | Kahn | 455/307 |
| 4,750,833 | 6/1988 | Jones | 356/93.1 |
| 4,793,676 | 12/1988 | Risk | 350/96.13 |
| 4,893,352 | 1/1990 | Welford | 455/610 |
| 5,078,464 | 1/1992 | Islam | 385/122 |
| 5,126,998 | 6/1992 | Stem, Jr. | 375/46 |
| 5,373,382 | 12/1994 | Pirio et al. | 359/161 |
| 5,491,576 | 2/1996 | Bergano | 359/156 |
| 5,705,959 | 1/1998 | O'Loughlin | 332/151 |
| 5,920,416 | 7/1999 | Beylet et al. | 359/181 |
| 5,940,196 | 8/1999 | Piehler et al. | 359/133 |
| 5,970,185 | 10/1999 | Baker et al. | 385/3 |

FOREIGN PATENT DOCUMENTS 0 312 190 A1  4/1989  European Pat. Off. .
2 205 172   11/1988  United Kingdom .

*Primary Examiner*—Leslie Pascal
*Attorney, Agent, or Firm*—Nixon & Vanderhye

[57] ABSTRACT

In transmission of optical signals in a dispersive medium, the signals are transmitted simultaneously in two modes in an optical fiber (15), which are orthogonal to each other, one of the signals being a non-chirped amplitude modulated signal modulated by an amplitude modulator (3), and the other signal is a phase modulated signal modulated by a phase modulator (5). The received signal is formed by the sum of the amplitude modulated contributions of the two signals. In an optical fiber system, two orthogonal modes of polarization in the same fiber can be chosen. In this manner it will be possible to transmit high bit rates and primarily over long distances.

26 Claims, 1 Drawing Sheet

COMPENSATION OF DISPERSION

This appln is a con't of PCT/SE96/00986 filed Aug. 2, 1996.

TECHNICAL FIELD

The invention relates to a method and devices for transmission of optical signals in dispersive medias, e.g. optical fibres.

PRIOR ART

In transmission of data in a dispersive medium, symbols which are transmitted will be distorted at high data rates. That is, the transmitted symbol will be effected by the medium through which it is transmitted, in such a manner that its duration in time will be extended. This results in that, at high data rates, a transmitted symbol is effected both by previously and subsequently transmitted symbols. This inter-symbol interference contributes to that the signal cannot be transmitted as long distances as would be liked without that the risk for faulty decisions in the receiver exceeds a tolerated, predetermined value.

Thus, there is a need to try to minimize the distortion which is imposed on the signal when it is transmitted in a dispersive media in order to extend the distance which the signal can be transmitted, or the distance at which the signal must be repeated by means of repeaters.

It is for this purpose known to transmit signals in two in relation to each other orthogonal modes, in particular orthogonal polarization modes.

The European Patent Application EP-A1 2 312 190 discloses an electro-optical converter for conversion of optical waves from one polarization mode to an orthogonal polarization mode, e.g. a TE-TM-converter. According to one aspect an apparatus controls the phase of an amplitude modulated input signal carried by a polarized optical wave, the optical wave being split into two orthogonally polarized components. Between the components a relative delay is introduced in correspondence to a shift in the phase of the amplitude modulated signal.

The British Patent Application GB-A 2 202 172 is related to the control of the phase in an amplitude modulated optical signal. An electro optical TE-TM converter splits the amplitude modulated plane polarized light into orthogonal-plane-polarized portions in a controlled amplitude ratio. A birefringent wave guide introduces a relative delay between the two portions equal to a quarter cycle of the amplitude modulation period. A light detector produces a signal, which is a vector combination of the signals carried by the two portions, phase shifted in accordance with said amplitude ratio.

The Patent U.S. Pat. No. 4,750,833 describes measuring of transmission dispersion of a single mode fibre, which is to be tested. Different forms of dispersion can be measured, such as chromatic dispersion and polarization dispersion.

The Patent U.S. Pat. No. 4,793,676 shows a fibre optic, acoustic-optic amplitude modulator, which couples light between two orthogonal polarization modes.

The Patent U.S. Pat. No. 4,893,352 describes an optical transmitter for modulated signals. Orthogonal optical signals on a common wave guide are obtained by splitting a light signal i a split wave guide, modulating at least one of the split signals and recombining the signals. One of the signals may be frequency, phase or amplitude modulated.

The Patent U.S. Pat. No. 5,078,464 shows an optical logic device, in which digital logical functions are realized by applying appropriate signal pulses to a non-linear shift or "chirp" element whose output is supplied to a dispersive element capable of supporting soliton propagation. Two orthogonally polarized pulses are supplied to the combination of the moderately birefringent fibre acting as the non-linear chirp element.

With the technique offered according to the prior art, performance at STM-16 level (Synchronous Transfer Mode level 16, i.e. about 2,5 Gbit/s) is a repeater distance of 60 kilometers for direct modulating lasers and in the case when prechirped external modulators are used, performance is about 75 kilometers at STM-64 level (Synchronous Transfer Mode level 64, i.e. about 10 Gbit/s).

One of the reasons for these limits is, as mentioned above, the pulse dispersion taking place in the fibre.

In order to improve the performance by means of different methods, which reduce the distortion imposed on the signals transmitted in fibre optical networks, primarily two main categories are noticed.

1. Prechirping of the transmitter, either by frequency modulating the transmitting laser and then amplitude modulate an external modulator, or by simultaneously frequency and amplitude modulate an external modulator.

2. Creation of an almost dispersion free fibre optic line by means of introducing dispersion compensating fibres along the signal path.

Working systems according to the above suggested methods have been tested in laboratories, but no system is yet commercially available. However, these ways are today the ways which appear most passable in order to improve the performance.

SUMMARY OF THE INVENTION

It is an object of the present invention to improve performance in transmission of data long distances in a dispersive medium, in particular a fibre optic cable.

It is a further object of the present invention to provide a method and devices by means of which it is possible to transmit higher bit rates, in particular in a fibre optic line, and over longer distances than is presently possible according to the state of the art.

These objects are obtained with the invention, the characteristics of which are set out in the appended claims.

In general a signal, which is to be transmitted in a dispersive medium, is predistorted in order to hereby compensate for the distortion which will be imposed on the signal when it propagates through the dispersive medium.

The predistortion is obtained by the fact that the signal, which is to be transmitted, is amplitude modulated without being chirped, and at the same time a predistortion is created by the fact that the transmitted signal also is phase modulated. These two signals, i.e. an amplitude modulated signal and a corresponding phase modulated signal, are thereafter transmitted in different modes, which have equally large propagation velocities. The phase modulated signal is used by the receiver for compensating the distortion which has been imposed on the amplitude modulated signal during the transmission in the medium. The compensation is obtained by adding the amplitude modulated contribution from the phase modulated signal to the amplitude modulated contribution of the amplitude modulated signal. Thus, a sum is formed in the receiver of the amplitude contributions of the two signals.

In particular, for example, for an optical fibre of single mode fibre type, the two modes used may be two orthogonal polarization modes, provided that the fibre used has a small enough polarization mode dispersion. Moreover, for this special case of the method the receiver becomes extremely simple, since the detector used can be a detector, which reacts for intensity but which is insensitive for polarization and phase modulation. This type of receiver is the standard receiver, which today is used for intensity modulated signals.

It is understood that also the reverse type of predistortion is possible. That is, predistortion of a phase modulated signal with an amplitude modulated predistortion, resulting in that the received signal is formed by the phase modulated contributions of the, in the two different modes, transmitted signals.

A transmission system based on this method should, according to performed computer simulations, be able to reach a performance of around 125 kilometers at STM-64 level, i.e. about 10 Gbit/s, which is slightly over 50% longer than what can be obtained according to the state of the art.

Hence, generally a signal is transmitted in a dispersive medium, such as an fibre optic line or a wave guide for micro waves, in particular a cavity wave guide, at the same time and in parallel in two orthogonal modes, where the signal in one mode is essentially amplitude modulated and the signal in the other mode is essentially phase modulated. This is the case if the angle between the modulation side band of the essentially amplitude modulated signal and the modulation side band of the essentially phase modulated signal is essentially equal to 90°.

In order for the transmitted signal to be safely decoded, the essentially phase modulated signal shall advantageously be transmitted on the fibre optical line or on the wave guide for micro waves less than one tenth of a bit interval before or after the corresponding essentially amplitude modulated signal.

A transmitter intended for such transmission comprises an amplitude modulator and a phase modulator, which are connected to receive a carrier wave from a suitable generator, such as a light source, typically a laser, or an oscillation circuit for micro waves. The modulators both receive the signal, which is to be transmitted, as modulation signal and at the same time modulate the carrier wave with this, so that at the same time from the transmitter to a transmission line is transmitted an essentially amplitude modulated signal and an essentially phase modulated signal. Thus, the amplitude modulator and phase modulator are advantageously connected, so that the phase difference between the modulation side bands of the transmitted essentially amplitude modulated and phase modulated signals respectively, is essentially equal to 90°.

A receiver, which is designed for an intensity modulated system, can be used in the transmission.

DESCRIPTION OF THE DRAWINGS

The invention will now be described as a non-limiting embodiment with reference to the accompanying drawings, in which.

DESCRIPTION OF A PREFERRED EMBODIMENT

Figure 1:
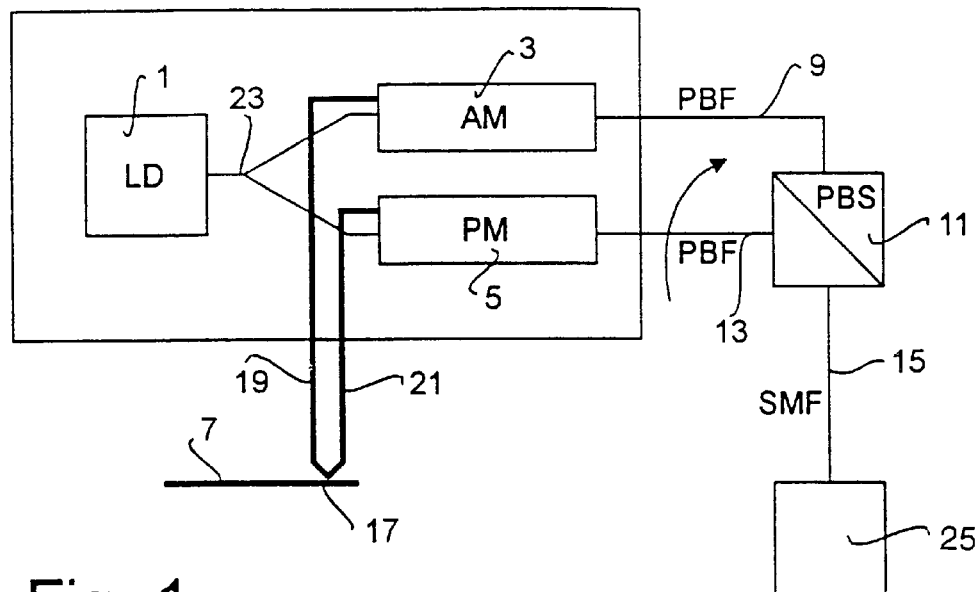
FIG. 1 is a block diagram, which shows a transmitter for transmission on an optical fibre link, FIG. 2 a schematic illustration of the two dominating orthogonal polarization modes in a quadratic cavity wave guide.

In FIG. 1 a transmitter which is intended to be used for transmitting signals is shown. The transmitter in this embodiment comprises a laser 1, which emits a light beam having a fixed frequency and amplitude. This beam is split into two parallel beams in a beam splitter 23. From the beam splitter 23 the two beams are guided to an amplitude modulator 3 and a phase modulator 5, respectively.

The two modulators 3 and 5 are modulated in parallel with an electrical signal, which is present on a line 7, carrying the information signal, and which is to be transmitted. This signal on the line 7 is split at 17 and transmitted to the amplitude modulator 3 and the phase modulator 5, on the lines 19 and 21, respectively. The output signal from the amplitude modulator 3 passes via a polarization preserving optical fibre 9 to one side of a polarization beam splitter 11, which here acts as a beam collector. The polarized output signal from the phase modulator 5 is transmitted to the polarization beam splitter 11 in such a manner that the signal in the polarization beam splitter 11 obtains a polarization which is orthogonal to the incoming output signal from the amplitude modulator 3. This can be achieved by means of some optically rotating element but simpler by transmitting the output signal through the polarization preserving optical fibre 13 to the other side of the polarization beam splitter 11 and rotating this fibre in a suitable manner.

The embodiment shown in FIG. 1 is assembled from a number of commercially available discrete components. However it should be perfectly possible to entirely or partly build a similar transmitter in an integrated form, which in many cases should be an advantage. Such a realization should for instance be possible to perform in $LiNbO_3$ or InP.

Thus, the signal, which leaves the polarization beam splitter 11, consists of two subsignals which are orthogonally polarized in relation to each other and thus will propagate in two orthogonally modes in relation to each other in an optical single mode fibre 15, which forms a link between a transmitter and a receiver. However, in practice, it turns out that entirely amplitude modulated modulators, which has been assumed above, can be difficult to obtain. Normally, such modulators impose a small phase modulated contribution to the signal. In order to compensate for this fact, the phase modulator can be designed, so that an amplitude contribution corresponding to the phase modulation contribution of the amplitude modulated signal is obtained.

Figure 3A:
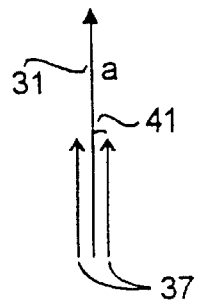
FIGS. 3a and 3b are phase vector diagrams, which show amplitude modulation and phase modulation, respectively.
Figure 3B:
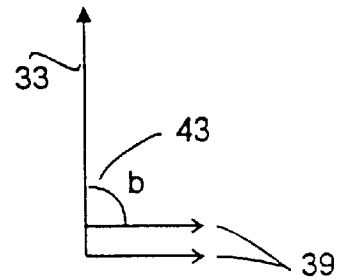

This is illustrated in the FIGS. 3a and 3b, which are phase vector diagrams. In FIG. 3a the amplitude modulated carrier wave at 31 is shown and in FIG. 3b the phase modulated carrier wave at 33 is shown. The side band of the amplitude modulated signal is shown at 37 and the side band of the phase modulated signal is shown at 39. The phase of the two carrier waves, which originate from the same source, will then have the same angular frequency. In the case when the angle a, shown at 41, i.e. the angle between the carrier wave and the modulation side bands, is equal to 0°, a pure amplitude modulation will be obtained. If on the other hand this angle is 90°, a pure phase modulation will be obtained. The latter is the case at 43, where the angle b is 90°. If now, due to imperfections in the modulation, the angle a, at 41, is not exactly 0° but somewhat larger or smaller, e.g. equal to c°, where c i a small number, this can be compensated by means of also letting the phase modulated signal be impaired by the same error, i.e. c°, as the amplitude modulated signal so that a different angle (b−a) still is essentially 90°. However, a small error in this difference angle should not significantly reduce the performance, but an optimum is obtained, when this difference angle is 90°.

The receiver 25 in this example comprises a standard receiver for an intensity modulated direct detecting system, which uses the sum of the amplitude modulated and phase modulated signals respectively as input signal. In order for this to work to satisfactory it is required that the signals transmitted in the respective orthogonal modes do not arrive essentially separated in time.

This puts requirements on the signal paths over which the signals propagate. In this aspect the common single mode fibre 15 used by the essentially amplitude modulated signal and by the essentially phase modulated signal, respectively, does not provide any problem, since the respective orthogonal signals propagate with the same velocity through this fibre. However, requirements arise on the electro-optical paths from the point where the electrical signal is split at 17 until they are merged together in the polarization beam splitter 11 and thereinbetween have travelled the different paths 17-19-3-9-11 and 17-21-5-13-11, respectively.

Moreover, requirements arise on the optical paths from the splitting of the laser beam at 23 until these pass over onto one and the same line again at the polarization beam splitter 11, i.e. the optical ways 23-3-9-11 and 25-5-13-11, respectively. Thus, the total difference in signal path must not provide a difference between the amplitude and phase modulated signals transmitted in the single mode fibre, which is essentially larger than the magnitude of one tenth of a bit interval.

If the major part of the transmitter is manufactured in an integrated form, these requirements will not be hard to fulfil. However, if the transmitter is manufactured as an assembly of a number of discrete components, such as in the example above, some form of adjustable delay elements will probably be needed to be incorporated, at least in the electro-optical signal path, in order to adjust the transmitter. However, this does not provide any difficulties since such adjustable electrical delay components are commercially available.

Furthermore, it has been shown in performed computer simulations that the ratio between the two modulation indexes of the different subsignals, i.e. the modulation index for the phase modulated signal/the modulation index for the amplitude modulation signal, approximately preferably should be 0.8. However, these performed computer simulations also show that this ratio is relatively insensitive in the interval 0.4–1.0.

Figure 2A:
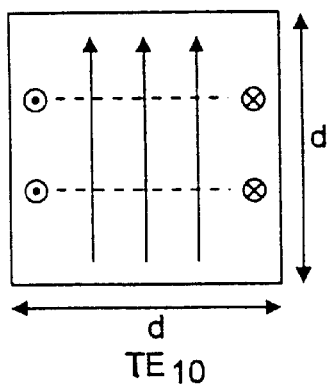
Figure 2B:
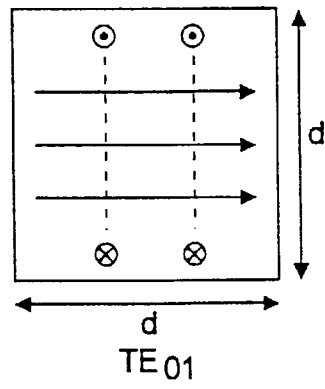

The above described transmission method can also have an application in micro wave systems. In such systems the $TE_{10}$ and $TE_{01}$ modes in a quadratic cavity wave guide the can form the orthogonal modes in which the two subsignals propagate. These modes are illustrated in FIG. 2. However, for these systems the receiver does not become equally simple as for an optical system. This is due to the fact that a receiver for micro waves in general are sensitive for polarization. Therefore, in a large number of cases, it will be necessary to construct such a receiver as two alike receivers arranged to receive the signal magnitudes in the different respective polarization modes in order to thereafter in a suitable manner add these signal magnitudes and use the obtained sum as output signal.

What is claimed is:

1. A method for transmission of a signal in a dispersive medium, in which the signal is transmitted in parallel in two orthogonal modes, wherein the signal in one mode is essentially amplitude modulated and the signal in the other mode is essentially phase modulated.

2. A method according to claim 1, wherein the signal is transmitted on one of a fibre optical line and a wave guide for micro waves.

3. The method of claim 2, wherein the signal is transmitted on a cavity wave guide.

4. A method according to claim 1, wherein the essentially phase modulated signal is transmitted on a fibre optic line or a wave guide for micro waves, less than one tenth of a bit interval before or after the corresponding essentially amplitude modulated signal.

5. A method according to claim 1, wherein the ratio between the modulation indexes of the essentially amplitude modulated signal and the essentially phase modulated signal is in the interval 0.4–1.0.

6. The method of claim 5, wherein the ratio between the modulation indexes of the essentially amplitude modulated signal and the essentially phase modulated signal is essentially equal to 0.8.

7. A method according to claim 1, wherein the angle between the modulation side band of the essentially amplitude modulated signal and the modulation side band of the essentially phase modulated signal is essentially equal to 90°.

8. A method for transmission of a signal modulated on a carrier wave in a dispersive medium, in which the signal is transmitted in parallel in two orthogonal modes, wherein modulation side bands of the two modes propagated signals area phase displaced in relation to each other with an angle which essentially is equal to 90°.

9. A method according to claim 8, wherein the signal is transmitted on one of a fiber optic line and a wave guide for micro waves.

10. The method of claim 9, wherein the signal is transmitted on a cavity wave guide.

11. A method according to claim 8, wherein the signal in one mode is transmitted on a transmission line at a point less than one tenth of a bit interval of the signal which is to be transmitted before or after the signal in the other mode.

12. The method of claim 11, wherein the transmission line includes one of a fiber optic line and a wave guide for micro waves.

13. A transmitter for a signal modulated on a carrier wave, which is to be transmitted in two orthogonal modes, and comprising at least two modulators, the transmitter comprising:

an amplitude modulator and a phase modulator connected to receive the carrier wave and to receive the signal so that an essentially amplitude modulated signal in a first mode and an essentially phase modulated signal in a second mode are transmitted from the transmitter at the same time in two orthogonal modes.

14. A transmitter according to claim 13, for transmitting a signal on an optical fibre, further comprising:

a light source, the emitted light of which constitutes the carrier wave and is guided to optical modulators comprising an amplitude modulator and a phase modulator, which are arranged to receive the signal, which is to be transmitted, as modulation signal.

15. A transmitter according to claim 13, wherein the amplitude modulator and phase modulator are connected, so that the phase difference between the modulation side bands of the essentially amplitude modulated and phase modulated signals respectively, transmitted from the transmitter, essentially is equal to 90°.

16. A transmitter according to claim 13, wherein the light source comprises a laser which provides a carrier wave to the two modulators.

17. A transmitter according to claim 13, wherein the transmitter is arranged to modulate the essentially amplitude modulated signal and the essentially phase modulated signal, so that the ratio between the modulation indexes thereof is in the interval 0.4–1.0.

18. The transmitter of claim 17, wherein the transmitter is arranged to modulate the essentially amplitude modulated signal and the essentially phase modulated signal, so that the ratio between the modulation indexes thereof is essentially equal to 0.8.

19. A transmitter according to claim 13, wherein the transmitter is arranged to transmit the essentially amplitude modulated signal less than one tenth of a bit interval of the signal, which is to be transmitted, before or after the essentially phase modulated signal is transmitted.

20. A transmitter for transmitting a modulated signal, comprising: at least two modulators, wherein the transmitter is arranged to transmit two parallel signals, the modulation side bands of which are displaced essentially 90° in relation to each other.

21. A transmitter according to claim 10, characterized in that the light source comprises a laser which provides a carrier wave to the two modulators.

22. A transmitter according to claim 20, characterized in that the transmitter is arranged to modulate an essentially amplitude modulated signal and an essentially phase modulated signal, so that the ratio between modulation indexes thereof is in the interval 0.4–1.0.

23. The transmitter of claim 22, wherein the transmitter is arranged to modulate the essentially amplitude modulated signal and the essentially phase modulated signal, so that the ratio between the modulation indexes thereof is essentially equal to 0.8.

24. A transmitter according to claim 20, intended to transmit the signal on an optical fibre, characterized in that a light source, the emitted light of which constitutes the carrier wave and is guided to optical modulators comprising an amplitude modulator and a phase modulator, which receives the signal, which is to be transmitted, as modulation signal.

25. A device for transmission of a signal modulated on a carrier wave comprising:

a generator for a carrier wave and a modulator connected to receive the signal;

a transmission line connected to receive an output signal from the modulator; and a receiver connected to the transmission line for detection of the signal transmitted on the transmission line, wherein the modulator includes an amplitude modulator and a phase modulator, which both are connected to the generator in order to receive the carrier wave, which both are connected to receive the signal, which is to be transmitted, as modulation signal, and which both are connected to the transmission line, so that at the same time to the transmission line an essentially amplitude modulated and an essentially phase modulated signal is transmitted.

26. A device for transmission of a signal modulated on a carrier wave comprising:

a generator for a carrier wave and a modulator connected to receive the signal;

a transmission line connected to receive an output signal from the modulator; and a receiver connected to the transmission line for detection of the signal transmitted on the transmission line, wherein the modulator is arranged to transmit two output signals to the transmission line, which both are modulated with the signal, which is to be transmitted, and the modulation side bands of which are essentially displaced in relation to each other by 90°.

* * * * *